Nov. 24, 1936.　　　　　G. W. NELSON　　　　　2,061,668
CARD DEALING AND SHUFFLING MACHINE
Filed Nov. 13, 1935　　　　4 Sheets-Sheet 1

INVENTOR.
GEORGE WILLIAM NELSON
BY Lawler + Lawler
ATTORNEYS.

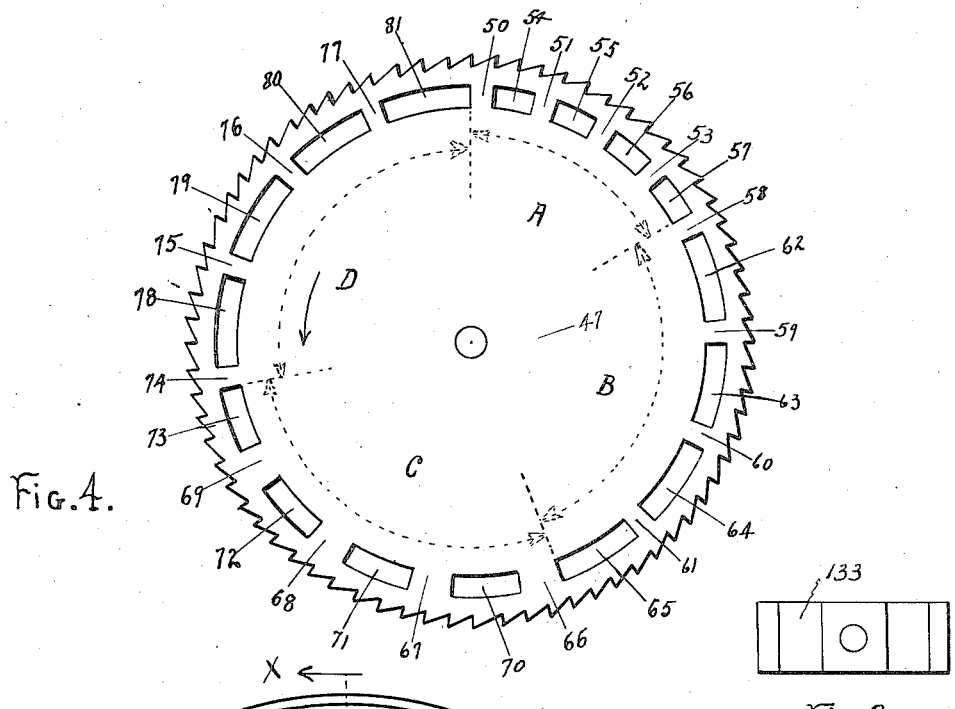
Fig. 4.
Fig. 6.
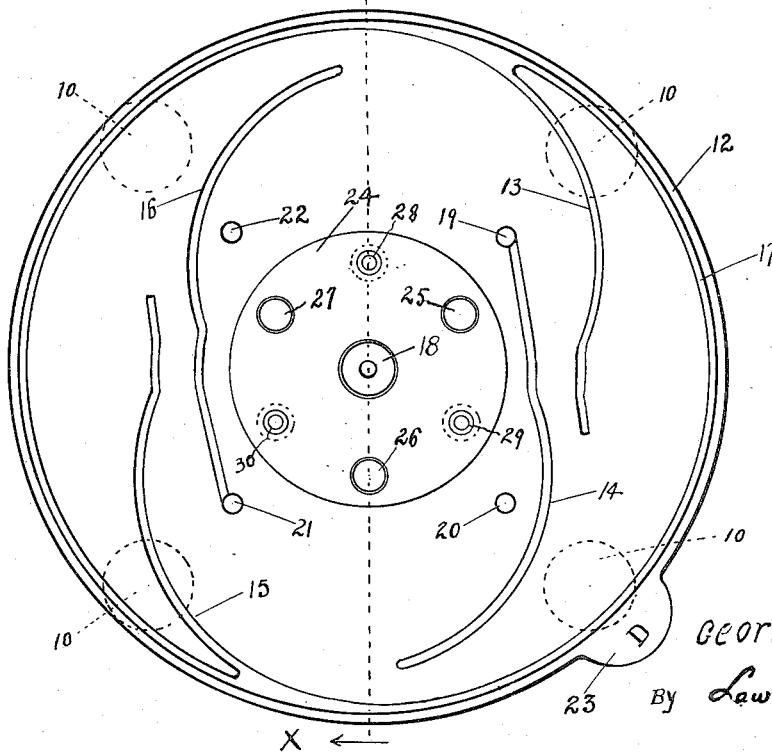
Fig. 5.
Fig. 7.
INVENTOR.
George William Nelson
By Lawler & Lawler
ATTORNEYS.

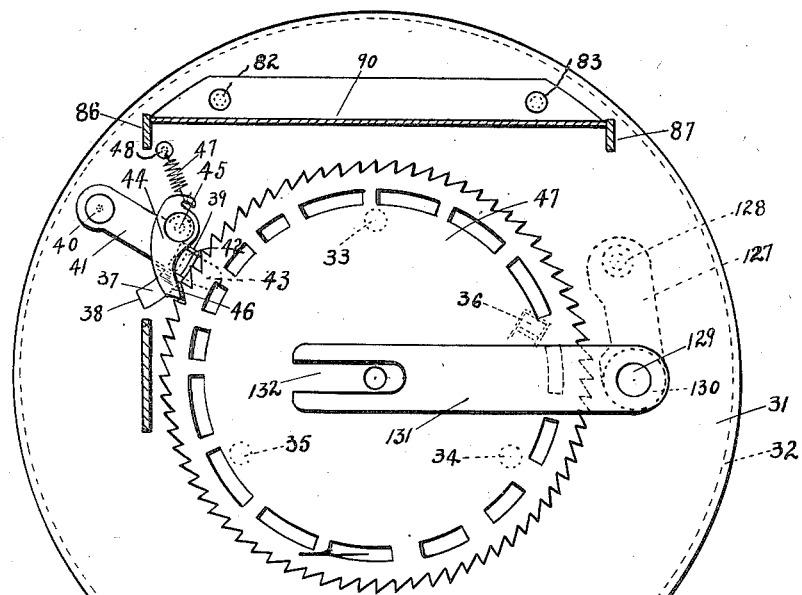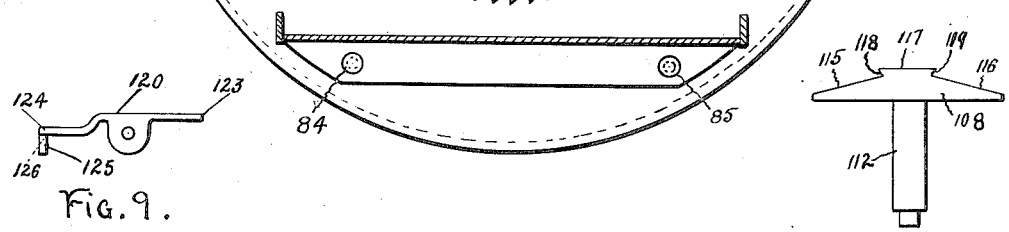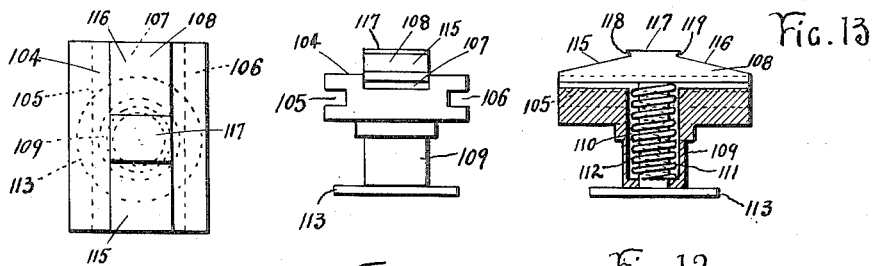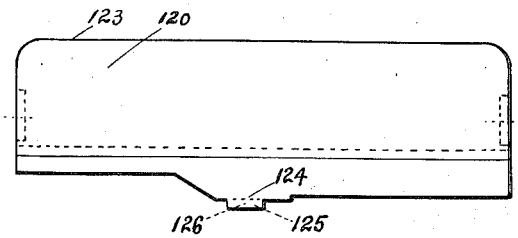

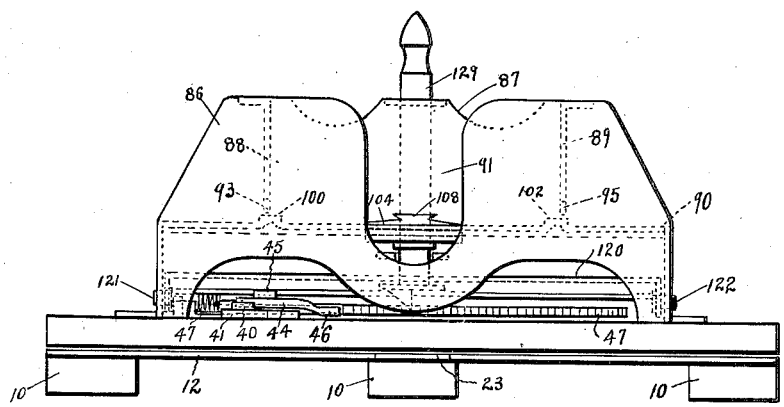
Fig. 16.
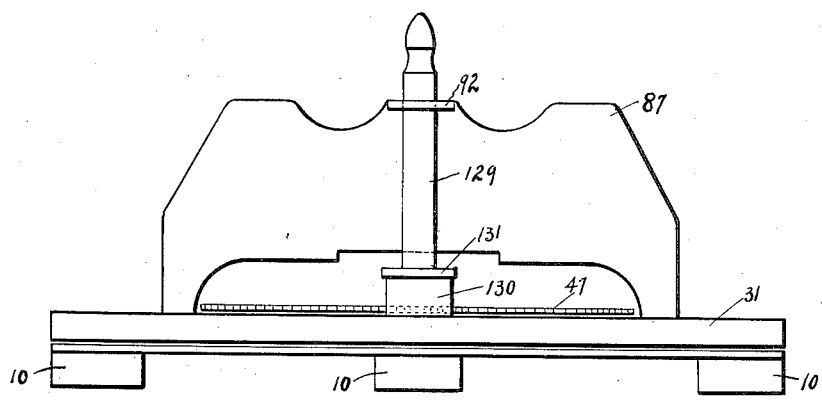
Fig. 17
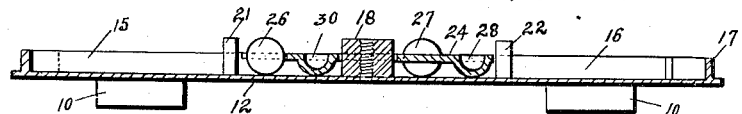
Fig. 18.
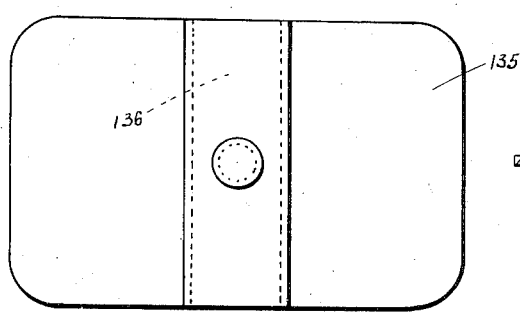
Fig. 19.
Fig. 20
INVENTOR.
GEORGE WILLIAM NELSON
BY
Lawler + Lawler
ATTORNEYS.

Patented Nov. 24, 1936

2,061,668

UNITED STATES PATENT OFFICE 2,061,668

CARD DEALING AND SHUFFLING MACHINE

George William Nelson, Cleveland, Ohio

Application November 13, 1935, Serial No. 49,516

12 Claims. (Cl. 273—149)

My invention relates in its broadest aspect to improvements in a card dealing and shuffling machine, such that a card may be ejected laterally from either side of a card carrying structure on rotation of the structure on a base through the instrumentalities of cams thereon, and an individual card ejecting means which reciprocates in the card carrying structure in a fixed platform therein. The cards are ejected intermittingly at predetermined intervals through the medium of cooperating means actuated in timed relation, and during a partial revolution of the card carrying structure on the base.

The rotary motion of the card carrying structure on the base is converted into reciprocating motion through the cams and is translated to arm or lever which gives the card ejecting means a reciprocatory motion transversely of the fixed platform in which the card ejecting means is slidably mounted in a centrally disposed slot on guide ways integral with the platform.

In the card ejecting means there is provided a card engaging member which reciprocates in the card ejecting means. The card ejecting means is controlled during the intermittencies by a lever pivotally supported intermediate its ends. This lever is actuated by interruptions in a toothed wheel. The actuation of the lever depresses the card engaging member in the card ejecting means and permits the card ejecting means to be reciprocated without ejecting a card until disengaged. The toothed wheel is also provided with a plurality of segmental slots which permits the cards to be delivered in certain definite sequences.

The invention further aims to provide a machine of the character referred to which will be automatic and accurate in action, strong, durable, efficient in use, and comparatively inexpensive to manufacture.

Other objects and advantages more or less ancillary to the foregoing and the manner in which the various objects are attained reside in the specific construction and arrangement of the instrumentalities peculiar to this machine, as will become apparent from a more complete examination and understanding of the specification which particularly describes and points out the specific combinations of parts and specific constructions indicative of the scope and spirit of the invention and in what manner the same is to be performed.

Throughout the drawings like reference characters indicate like parts.

Fig. 4 is an enlarged plan view of the toothed-wheel showing its construction with its interruptions and segmental slots therein, and showing how it is laid out into four sectors.

Fig. 5 is a plan view of the base showing how the cams are placed on the base, the four upstanding studs, and the anti-friction bearing therein centered by the central integral boss in the base, and also the lug or ear with the letter D thereon.

Fig. 6 is a plan view of the leaf spring, used to exert its pressure on various parts when the machine is assembled.

Fig. 7 is a side view of the leaf spring.

Fig. 8 is a plan view of the plate on which the card carrying structure is mounted, parts of the structure that carries the cards, and the platform has been cut away to show the toothed-wheel, the position of the actuating pawl with its spring, the position of the arm that carries the roller that engages the cams on the base, is shown in the chain line below the plate, to show its angular position with relation to the lever that actuates the card ejecting means, the position of the protuberances that space the toothed-wheel from the plate, and the limiting lug in the plate adapted to limit the travel of the arm carrying the roller in one direction.

Figure 1:
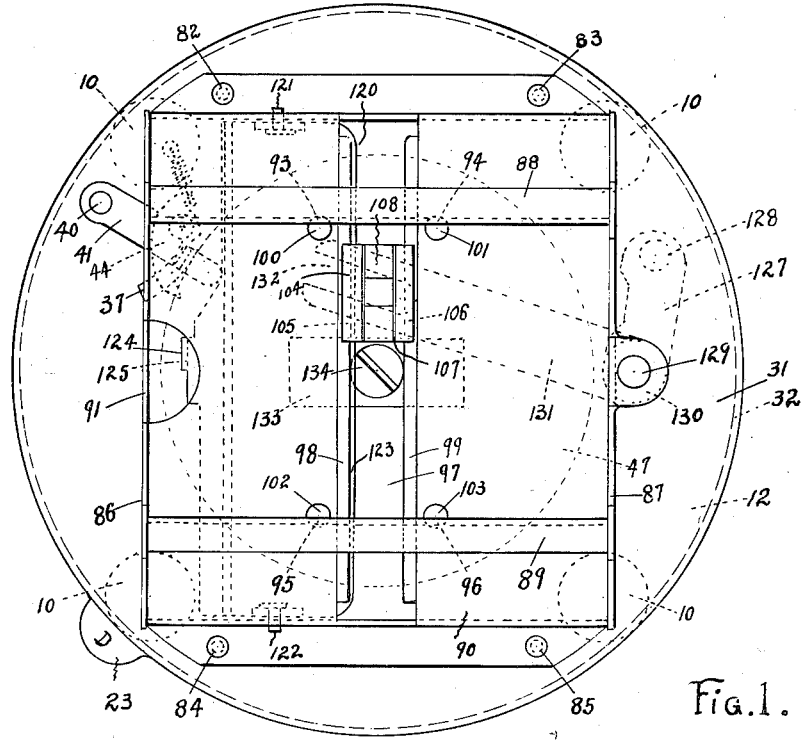
Fig. 1 is a plan view of the card dealing and shuffling machine with the cover or weight removed therefrom, and showing in chain lines the relative position of the toothed-wheel, the lever that reciprocates the card ejecting means, the arm having a roller thereon that engages the cams on the base when the card carrying structure is rotated thereon.
Figure 3:
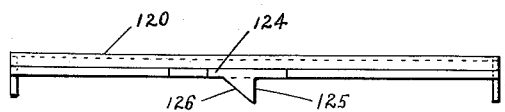
Fig. 3 is a front view of the lever that is employed to actuate the card engaging member in the card engaging means, and showing the inclined face on a portion thereof that engages the interruptions in the toothed-wheel.
Figure 2:
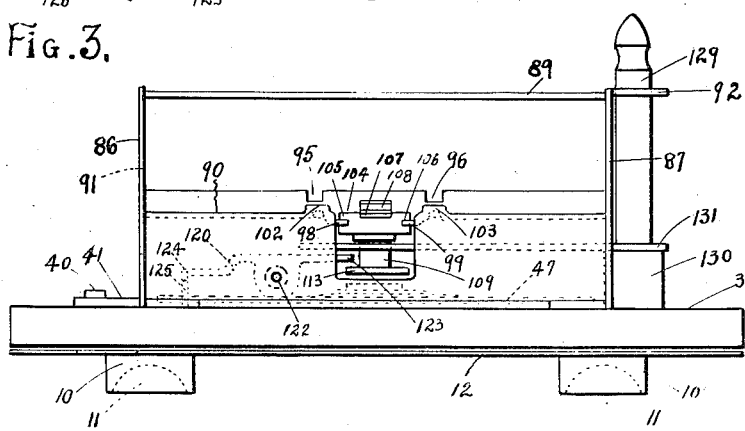
Fig. 2 is an end view showing the card ejecting means mounted on the guide ways in the platform, the relative position of the gage at that end above the bosses (the other end is exactly the same) also the relative position of the lever that impinges upon the disc fixed to the card engaging member when the said member is in active position.

Fig. 9 is an end view of the lever shown in Fig. 3 and showing the lever as it stands when in inactive position, in other words it is parallel with the top of the plate that carries the toothed-wheel.

Fig. 10 is an enlarged plan view of the card ejecting means, or cross-head.

Fig. 11 is an enlarged end view of the ejecting means or cross-head, showing the lateral grooves therein, adapted to receive the guide ways in the platform. The card engaging member in the cross-head is shown as it would appear in active position, the disc on the end of the stem of the card engaging member is in contact with the projection on the underside of the cross-head.

Fig. 12 is an enlarged sectional view of the cross-head showing the chamber therein, a helical spring mounted in the chamber and surrounding the stem of the card engaging member, and the disc on the end of the card engaging member. The spring yieldingly maintains the card engaging member in operative engagement with a card.

Fig. 13 is a side view of the card engaging member with the disc removed therefrom, and showing the inclined arms leading up to the transverse portion that engages the cards, and showing the edges of the transverse portion slightly undercut.

Fig. 14 is an end view of the lever shown in Fig. 3, and showing its relative position when tilted in the platform by an interruption in the toothed-wheel.

Fig. 15 is a plan view of the lever shown in Fig. 3, and showing how the portion that engages the disc on the card engaging member extends the length of the lever, while the portion that engages the interruption is positioned approximately in the center of the lever on its opposite side.

Fig. 16 is a side view of the machine and showing the wall with the slot therein to facilitate easy mounting of the cards in the machine.

Fig. 17 is a view showing the opposite wall to show it is fashioned, and the lug integral therewith in which the shaft is journaled.

Fig. 18 is a sectional view of the base on line X X in Fig. 5 and showing the studs extending above the cams, and the construction of the cage in which the ball bearings are retained.

Fig. 19 is a plan view of the cover or weight.

Fig. 20 is a sectional view thereof and showing the transverse groove provided therein.

The supports or feet 10, are each provided with a concavity 11, adapted to make the machine adhere to a surface and prevent movement thereof while in operation. The supports may also be made of resilient sound deadening material such as sponge rubber or the like. The supports are fixed to the base of the machine in any practical manner.

The base 12 is provided with four cams 13, 14, 15, and 16. The cams 13 and 15 coalesce with the annular flange 17 integral with the base. On the base there is provided a centrally located boss or hub 18, and four upstanding studs 19, 20, 21, and 22, these studs are higher than cams. On the base there is also provided a lug or ear 23 with the letter D thereon.

In the base there is positioned an anti-friction bearing consisting of a cage 24 having apertures therein to receive the ball bearings 25, 26, and 27. The cage is supported by protuberances 28, 29, and 30 integral therewith that position the cage so that it will maintain the ball bearings in proper operative relation in the base.

On the base there is mounted a card carrying structure. This structure comprises a plate 31, having an annular skirt 32. The plate is provided with protuberances integral with plates 33, 34, and 35, and limiting lug 36. The limiting lug is forced downward and is adapted to limit the travel of the arm of the reciprocating mechanism in one direction. The protuberances are adapted to support a toothed wheel in parallel relation with the plate, and reduce the friction between the plate and the toothed-wheel.

The plate is also provided with an arcuate slot 37 of a length sufficient to permit proper actuation of an arm that passes therethrough to engage the studs on rotation of the card carrying structure on the base. The walls 38 and 39 of the slot limit the travel of the arm that carries the pawl that is pivoted thereto. The arm is pivotally connected to the plate by the pivot 40. The arm 41 is bent and passes through the arcuate slot in the plate. The end 42 that passes through the slot is reduced in width and the inwardly-extending portion 43 of the arm which underlies the plate extends horizontally and is parallel with the underside of the plate. On the arm there is provided a pawl 44. This pawl is pivotally mounted on the top of the arm by pivot 45. The end of the pawl 46 is off-set downward to engage a tooth in the toothed-wheel. The pawl is returned to active position by the coil spring 47 which is connected to the pawl at one end, and to a stud 48 at the other end. This coil spring normally maintains the pawl in spring-pressed engagement with the toothed-wheel.

The toothed-wheel 47 is mounted on the plate and is supported in parallel relation thereon by the protuberances in the plate. The toothed wheel is provided with 72 teeth around its periphery. The plate is laid out in four sectors as shown in Fig. 4 by the chain lines and the arrow heads connecting the same, and marked A, B, C, and D.

The sector A is provided with four interruptions 50, 51, 52, and 53; and four segmental slots, 54, 55, 56, and 57. It will be noted that the interruptions are represented by one tooth each on the toothed wheel, while the slots are represented by two teeth each on the toothed-wheel.

The sector B is provided with four interruptions 58, 59, 60, and 61, and four segmental slots 62, 63, 64, and 65. It will be noted that the interruptions are represented by one tooth each on the toothed-wheel, while the slots are represented by four teeth on the wheel.

The sector C is provided with four interruptions 66, 67, 68, and 69, and four segmental slots, 70, 71, 72, and 73.

It will be noted that the interruptions are represented by two teeth on the toothed-wheel, while the slots are represented by three teeth each on the wheel.

The sector D is provided with four interruptions 74, 75, 76 and 77, and four segmental slots 78, 79, 80, and 81. It will be noted that the interruptions are represented by one tooth each, while the slots are represented by four teeth each on the toothed-wheel.

The interruptions in the wheel are represented by 20 teeth, while the slots are represented by 52 teeth. It has been found that it takes 18 complete revolutions of the card carrying structure to eject the 52 playing cards in a deck, with the above described toothed-wheel, and that during the 18 revolutions, the card engaging means in the card ejecting means has been rendered inactive 20 times by the interruption in the toothed wheel and its cooperating lever that depresses the card engaging means in the ejecting means.

The card carrying structure proper is riveted to the plate by rivets as at 82, 83, 84, and 85, and comprises two end walls 86 and 87, and two side walls 88 and 89; and a fixed platform 90. In the end wall 86 there is provided a slot 91 to permit easy mounting of the cards in the card carrying structure. The wall 87 is provided with an integral lug 92 having a bore therein to snugly engage a shaft hereinafter described.

The side walls 88 and 89 are fixed between the end walls, and each wall is so constructed that it is provided with fixed spaced gages 93, 94, 95, and 96.

The platform 90 is fixed between the end walls, and is secured to the plate that carries the card carrying structure. In the platform there is provided a central transverse slot 97, in this slot there is provided guide ways 98 and 99 integral with the platform. The platform is provided with four upstruck bosses 100, 101, 102, and 103. These bosses provide a four point suspension for a card when placed thereon, so that the card is held in suspended and spaced parallel relation with the platform. When the last card has been ejected from the platform the cover or weight hereinafter described rests on these bosses, because it is provided with a central race deep enough to miss the card engaging means in the card ejecting means, and if it straddled these bosses its weight is such that it would force the card down laterally of the bosses and bow it up in the middle so that the last card would be ejected with difficulty, because the gages above the bosses are so positioned with respect thereto that one card only can pass between the bosses and the gage.

The platform is die pressed in such a way that the bosses are rendered harder and more closely grained than the rest of the metal proper in the platform. The bosses are in this way given a hard wearing surface. The protuberances in the plate are likewise produced by special die pressing.

The ejecting mechanism consists of a cross-head 104 that slidably and snugly fits the guide in the platform. The cross-head is provided with lateral grooves 105 and 106 to receive the ways in platform.

On the upper side of the cross-head there is provided a recess 107 to receive the card engaging means 108. On the under side of the cross-head there is an integral projection 109 adapted to fit the bifurcated end of the actuating lever. This projection is provided with a chamber 110 for the reception of a helical spring 111 that surrounds the stem 112 of the card engaging member. On the lower end of the stem there is provided a disc 113 fixed thereto. The card engaging member 108 is of T shaped configuration. The arms 115 and 116 thereof are inclined as shown. Intermediate the arms there is provided an upstanding portion 117. This portion is of a height slightly less than the thickness of a card. The edge 118 and 119 thereof that engage the edge of a card is slightly undercut, so that when a card is engaged thereby it will not slip up and over the upstanding portion. The card engaging member is urged upward by the helical spring in the chamber in the cross-head. The card engaging member is constructed to engage a card from either side. The cross-head is so constructed that the card engaging member may be depressed so that it will not engage a card as the card ejecting means is being reciprocated transversely in the platform.

The mechanism for controlling the intermittencies of ejecting means consists of a lever 120, that is pivoted in the platform on pivots 121 and 122. The lever extends across the platform and on the underside thereof. The end 123 is adapted to engage the disc on the card engaging member, while the end 124 is provided with a down turned portion 125 having an inclined face 126 adapted to engage the interruptions in the toothed-wheel when actuated. The incline is provided so that the portion will ride up and out of a slot easily. Obviously the impingement of the lever end on the card engaging member disc depresses the card engaging member in the cross-head. Just as soon as the wheel is advanced so that the portion 125 is relieved from the interruption and is free to enter a slot, the spring in the cross-head snaps the lever up, thus allowing the card engaging member to become active.

The reciprocating mechanism comprises an arm 127 having a roller 128 thereon, the arm is fixed to the end of the shaft 129. The shaft extends through the plate, and above the plate there is provided a spacer 130, above this spacer is provided a lever 131 having a bifurcated end 132, this lever is fixed to the shaft. The projection on the cross-head is mounted in the slot formed by the furcations on the lever. The upper end of the shaft is journaled in the lug integral with the wall of the card carrying structure. The shaft extends ample above the wall to provide a means to turn the machine upon its base.

The roller on the arm engages the cams on the base as the device is rotated clockwise on the base and being fixed to the shaft on which the bifurcated lever is also fixed which operate the ejecting means, the rotary motion of the structure on the base through the cams impart a reciprocating motion to the card ejecting means.

The toothed-wheel is automatically advanced by the arm carrying the pawl coming into contact with the studs fixed in the base. The toothed-wheel is advanced counter clockwise as the card carrying structure is turned clockwise.

A leaf spring 133 is positioned above the toothed-wheel and is held in position by the pivot 134. This spring exerts its pressure downward to keep the various members in frictional engagement.

Mounted in the card carrying structure, above the cards, is a weight or cover 135, having a transverse groove 136, ample to let the card ejecting means reciprocate freely thereunder when the last card is ejected. This weight gravitates with ejecting of each card.

The operation of the machine is as follows.

The playing cards are mounted in the machine, the cover placed thereon. The ear with D thereon is placed before the dealer, also the wall with the slot therein. The machine is now ready to start the deal, it matters not the position of the interruptions or the slots in the toothed-wheel. The card carrying structure is turned clock-wise, and as it is turned, the card ejecting means is reciprocated in the platform, missing and ejecting the cards until the 52 cards are delivered. When the cards are finally dealt they are delivered before the respective players, each having 13 cards.

In dealing playing cards by hand it is customary for the dealer to shuffle and sometimes cut the cards after shuffling, before finally distributing the cards in rotation to the respective players around the card table. In the systems known prior to my invention, various methods have been employed, such as receiving compartments for the cards and the like, but my invention differs fundamentally from the systems used in the prior art, in that the card compartments are eliminated, the cards being ejected from the machine in cycles intermittently to the players until the pack of cards is finally distributed to the players equally.

Because of the irregular distribution of the cards to the players it has been found unnecessary to shuffle and cut the cards before placing them in the machine previous to dealing operation.

By releasing the pawl from the toothed-wheel and placing the lever that controls the card engaging means in a slot, thus rendering the lever inactive, a card may be dealt from the machine in each quarter turn of the card carrying structure, making the machine a dealing device only.

It is believed that the operation of the mechanism as a whole will be clear, in view of the foregoing description which has been given in connection with that of the construction.

While I have herein shown and described a preferred arrangement it will be readily understood that changes and modifications therein may be found desirable or essential in meeting the various exigencies of use, and I desire to be understood as reserving the right to make any and all such changes or modifications as may be found desirable or essential in so far as the same may fall within the spirit and scope of the invention as expressed in the accompanying claims when broadly construed.

Having now described my invention what I claim as new and desire to secure by Letters Patent is:—

1. A playing card dealing and shuffling device comprising a base, cams on the base, means for receiving a deck of cards pivotally mounted on the base, a fixed platform in the aforesaid means having a longitudinally extending guide way therein and upstruck bosses thereon, a reciprocating card ejecting means comprising a yielding card engaging means slidably mounted in the guide way, the card ejecting means being actuated by a crank arm engaging the cams on rotation of the card receiving means on the base, the upstruck bosses adapted to maintain the deck of cards in spaced relation with the platform, gages above the bosses effective to arrest the ejection of more than a single card from the deck, a toothed wheel having within the wheel intermitting means, a pivotally mounted lever in the card receiving means below the platform adapted to effect relative movement between the intermitting means and the yielding card engaging means, and a ratchet instrumentality automatically controlled to render the toothed wheel operative to bring the intermittencies therein into and out of operative relation with lever thus producing the intermittencies of the card engaging means in the card ejecting means during its reciprocations.

2. A playing card dealing and shuffling device comprising a base, cams on the base, means for receiving a deck of cards pivotally mounted for rotation on the base, a fixed platform in the card receiving means, gages in the card receiving means, the gages being effective to arrest the ejecting of more than a single card at a time from the deck, a reciprocating card ejecting means comprising a card engaging member slidably mounted on a spaced guideway therein, reciprocating mechanism actuating the card ejecting means through the instrumentality of a lever arm engaging the cams on rotation of the card receiving means on the base, intermitting means adapted to produce intermittent engagement with the cards by the card engaging member, automatically controlled mechanism controlling the intermitting means comprising a pawl carrier having a pawl therein, and a lever adapted to actuate the card engaging means in the card ejecting means, and means normally urging the card engaging member upward in the card ejecting means to maintain the said means in proper card engaging position throughout its operation when free from the influence of the lever actuating the said card engaging means.

3. A playing card dealing and shuffling device comprising a base, cams on the base, means for receiving a deck of cards mounted for rotation on the base, a fixed platform in the card receiving means, a reciprocating mechanism operatively associated with the cams by a lever arm, and with the card ejecting means having a card engaging member therein by a bifurcated lever, the aforesaid card ejecting means being actuated by the cams on rotation of the card receiving means, a ratchet wheel, means to advance said wheel, intermitting means within the ratchet wheel disposed in a circle and positively governing a lever in such a manner that the lever occupies a neutral position during a predetermined advance of the ratchet wheel by the advancing means to permit a predetermined number of cards to be ejected from the card receiving means before the intervention of interrupting means in the ratchet wheel that actuates the lever that controls the card engaging member in the card ejecting means.

4. A playing card dealing and shuffling device comprising a base, cams on the base, means for receiving a deck of cards mounted for rotation on the base, a platform in the card receiving means, a reciprocating card ejecting means having therein a card engaging means adapted to engage the card being ejected, reciprocating mechanism, the reciprocating mechanism consists of the cam mechanism on the base adapted to move a lever arm fast on the lower end of a vertically-extending shaft having a bifurcated lever also fast on the shaft, the bifurcated lever being operatively associated with the card ejecting means, a pivoted lever beneath the platform and adapted to control the card engaging means in the card ejecting means, a wheel having a ratchet periphery and also having intermitting means within the wheel, a spring controlled pawl carried by an arm and actuated by upstanding studs in the base whereby the intermitting means in the ratchet wheel are brought into engagement with the lever controlling the card engaging means in the card ejecting means to produce irregular distributions in the card ejections.

5. A playing card dealing and shuffling device comprising a base, cams on the base, a card receiving means mounted for rotation on the base, a platform in the card receiving means, a reciprocating card ejecting means having a card engaging means yieldingly mounted in the card ejecting means, means for reciprocating the card ejecting means comprising a lever arm, vertically-extending shaft, and an open ended lever, the lever arm and the open ended lever fast on the shaft, the lever arm translating movement through the instrumentalities of the cams to the shaft and open ended lever operatively associated with the card ejecting means, a disc wheel provided on its periphery with ratchet teeth and having segmental areas therein curved to the outer curvature of the disc and having differentially dimensioned intermitting means between the segmental area, a pivoted lever in the card receiving means beneath the platform, said lever adapted to control the card engaging means in the card engaging means through the intervention of the intermitting means in the disc wheel, means adapted to advance the disc wheel comprising an arm and a pawl, the said means being automatically controlled by engaging means fixed in the base on rotation of the card receiving means on the base.

6. A playing card dealing and shuffling device comprising a base, cams on the base, a card receiving means mounted for rotation on the base, a platform in the card receiving means, a reciprocating card ejecting means comprising a card engaging means in the platform, reciprocating mechanism cooperating with the cams through the instrumentality of a lever arm, and with the card ejecting means through a shaft having a forked end, a ratchet wheel having irregular cam means within it, a pawl-and-ratchet adapted to advance the ratchet wheel counter clockwise, means in the base for automatically actuating the pawl-and-ratchet to bring the irregular cam means in the ratchet wheel into position, a lever in the card receiving means and adapted to control the card engaging means in the card ejecting means, the said lever being automatically settable by the irregular cam means to disable the card engaging means in the ejecting means.

7. A playing card dealing and shuffling device comprising a base, cams on the base, a card receiving means mounted for rotation on the base, a platform in the card receiving means, a reciprocating card ejecting means in the platform adapted to eject a card from either side of the card receiving means, a card engaging member in the card ejecting means, means for reciprocating the card ejecting means comprising a lever-system cooperating with the cams and the card ejecting means, a toothed wheel superimposed above the base, segmental slots constituting different areas in the toothed wheel, interruptions between the slots, said interruptions adapted to exercise controlling action upon a lever in the card receiving means adapted to control the card engaging member in the ejecting means, means in the card ejecting means adapted to return the lever to inoperative position when released from the controlling influence of an interruption, and means spaced on the base for actuating an arm carrying a pawl into engagement with the toothed wheel to impart movement thereto.

8. A playing card shuffling and dealing device comprising a base, cams on the base, a plate above the base adapted to support a card receiving means, the card receiving means fixed to the plate, the plate having an arcuate slot therein, the end walls of which provide limiting stops for a pawl-and-ratchet in its movement, a platform in the card receiving means, a reciprocating card ejecting means having a controlled card engaging means therein in the platform, the reciprocating mechanism comprising a lever arm operatively associated with the cams and a bifurcated lever operatively associated with the card ejecting means by means of a projecting member integral therewith, a pawl-and-ratchet supported by the plate, the ratchet portion thereof having section passing through the arcuate slot in parallelism with the underside of the plate and adapted to engage means positioned in the base, a toothed member above the plate supporting the card receiving means, interruptions within the toothed member, the interruptions adapted to exercise controlling action upon the card engaging member in the card ejecting means to render the card engaging means inoperative, and further means in the toothed wheel and the card ejecting means to restore the means controlling the card engaging means to again become operative, the pawl-and-ratchet being automatically controlled to advance the toothed wheel in timed relation with the card ejecting means through engagement with the means positioned in the base to bring about one of a plurality of interrupted card ejections through the interventions of the means exercising control over the card engaging means in the card ejecting means.

9. A playing card dealing and shuffling device comprising a base, cams on the base, a card receiving means mounted for rotation on the base, a platform in the card receiving means having upstruck bosses harder and denser than the platform adapted to support the cards in spaced relation with the platform, a reciprocating card engaging means in the platform, a card engaging member vertically-movable in the card ejecting means, reciprocating mechanism cooperating with the cams through the instrumentality of a lever arm, and with the card ejecting means by means of a forked lever arm, said reciprocating mechanism actuating the card ejecting means on rotation of the card receiving means on the base, an anti-friction bearing in the base adapted to reduce friction between the base and card receiving means on rotation of the card receiving means on the base, a toothed wheel, means for automatically moving said toothed wheel, means in the toothed wheel adapted to actuate a lever controlling the card engaging member in the card ejecting means to intermittently interrupt the ejection of the card from the card receiving means without exerting any control upon the reciprocating mechanism when the intermittency has taken place, a leaf spring above the toothed-wheel exerting its pressure to maintain the parts in frictional contact, a plate gravitating with the ejection of each card from the card receiving means and adapted to maintain engagement of the card with the card engaging member in the card ejecting means, and spaced sound deadening means supporting the device.

10. In a playing card dealer comprising a base, cams on the base, means for receiving a deck of cards mounted for rotation on the base, a fixed platform in the card receiving means, means for supporting the deck of cards in suspended parallel relation thereto, diametrically disposed gages in the card receiving means, the said gages adapted to restrain all the cards in the deck except the one being ejected, reciprocating mechanism comprising a lever arm, a bifurcated lever and a connecting shaft between the levers, a card ejecting means having opposed card engaging means therein and adapted to engage the card from either side to eject the same from the confronting side of the card receiving means, the card ejecting means being reciprocally mounted in the platform, the lever arm being operatively associated with the cams, and the bifurcated lever with the card ejecting means, the cams adapted to translate movement to the reciprocating mechanism to reciprocate the card ejecting means in the platform on rotation of the card receiving means on the base, a weighable plate gravitating with the ejection of each card, the said plate adapted to maintain the card being ejected in contact with the card engaging means in the card ejecting means, and sound deadening and shock absorbing blocks supporting the dealer.

11. A device as defined by claim 10 further characterized in that the weighable plate is provided with a central race deep enough to permit reciprocation of the card ejecting means freely thereunder after the last card is ejected from the card receiving means.

12. In a playing card dealer comprising a base, cams on the base, means for receiving a deck of cards mounted for rotation on the base, a fixed platform in the card receiving means, means for supporting the deck of cards in suspended parallel relation thereto, diametrically disposed gages in the card receiving means, the said gages adapted to restrain all the cards in the deck from being ejected except the one being ejected, reciprocating mechanism comprising a lever arm, a forked lever arm and a connecting shaft for the levers, a card ejecting means, a card engaging means yieldingly mounted in the card ejecting means having opposed card engaging portions thereon and adapted to engage a card from either side to eject the same from the side confronting the card engaging portion from the card receiving means, the card ejecting means being reciprocally mounted in the platform, the lever arm being operatively associated with the cams, and the forked lever with the card ejecting means, the cams adapted to translate movement to the reciprocating mechanism to reciprocate the card ejecting means in the platform on rotation of the card receiving means on the base, the yielding card engaging means adapted to yieldingly maintain the card engaging means in operative engagement with the card above the card being ejected in such a way as to avoid the dangerous consequences of defacing the card above, a weighable plate gravitating with the ejecting of each card and adapted to hold the cards in contact with card engaging means, and spaced supporting blocks for the dealer.

GEORGE WILLIAM NELSON.